(12) United States Patent
Yamazaki et al.

(10) Patent No.: US 8,128,499 B2
(45) Date of Patent: Mar. 6, 2012

(54) GAME DEVICE, GAME CONTROL METHOD, AND INFORMATION STORAGE MEDIUM

(75) Inventors: Yukihiro Yamazaki, Tokyo (JP); Hirotaka Ishikawa, Tokyo (JP); Shinichi Kasahara, Hokkaido (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 998 days.

(21) Appl. No.: 11/795,237

(22) PCT Filed: Dec. 21, 2005

(86) PCT No.: PCT/JP2005/023530
§ 371 (c)(1),
(2), (4) Date: Jul. 13, 2007

(87) PCT Pub. No.: WO2006/075495
PCT Pub. Date: Jul. 20, 2006

(65) Prior Publication Data
US 2008/0188305 A1    Aug. 7, 2008

(30) Foreign Application Priority Data
Jan. 14, 2005    (JP) .................................. 2005-008333

(51) Int. Cl.
*A63F 13/00* (2006.01)
(52) U.S. Cl. .................................................... 463/36
(58) Field of Classification Search .................. 463/36, 463/7; 434/138, 128
See application file for complete search history.

(56) References Cited

U.S. PATENT DOCUMENTS 6,482,087 B1 * 11/2002 Egozy et al. ....................... 463/7
6,786,821 B2 *  9/2004 Nobe et al. ....................... 463/31

FOREIGN PATENT DOCUMENTS

| JP | 08-305356 A | 11/1996 |
| JP | 2003-117234 A | 4/2003 |
| JP | 3566195 B2 | 6/2004 |

OTHER PUBLICATIONS

"Dorimaga shinchaku Joho", Syukan Dreamcast Magazine, 2000/ vol. 11, Mar. 31, 2000, pp. 114-115, Tom Maeda, Softbank Publishing Corporation (JP).

* cited by examiner

*Primary Examiner* — Melba Bumgarner
*Assistant Examiner* — Thomas H Henry
(74) *Attorney, Agent, or Firm* — Sughrue Mion, PLLC

(57) ABSTRACT

There is provided a game device capable of provoking a competing mood between players in a music game. In order to show each of a first and a second player the timing when a game operation is to be performed, reference arrow marks (46, 48) and a special timing guide arrow mark (61) gradually approaching the reference arrow marks (46, 48) are displayed. According to an evaluation result of game operation by the actual players, the display position of the special timing guide arrow mark (61) is gradually moved toward the display position of the reference arrow marks (46, 48) relating to the battle partner so as to impose a new game operation timing to a competing opponent.

13 Claims, 10 Drawing Sheets

82

84

(a)

(b)

GAME DEVICE, GAME CONTROL METHOD, AND INFORMATION STORAGE MEDIUM

TECHNICAL FIELD

The present invention relates to a game device, a game control method, and an information storage medium and, in particular, a video game for allowing a first player and a second player to perform game operation in time with game music.

BACKGROUND ART

In most music games in which a player enjoys executing game operation in time with game music via a controller, two types of timing instruction image are displayed on a game screen and one of the images gradually approaches the other. Such music games are designed to cause at least one of two types of timing instruction image to approach the other in time with game music and in accordance with timing data which is created in advance. The gradual reduction in relative distance between those two types of timing instruction image informs a player of the impending arrival of a time to execute a game operation.

Patent Document 1, for example, discloses a variation of music game that is designed as a competing type game. In the game disclosed by this document, two opposing players are each evaluated for how well they execute game operation and, depending on the evaluation result of one player, the other player is given additional guidance about when to execute game operation.
[Patent Document 1] JP 3566195 B

DISCLOSURE OF THE INVENTION

Problems to be Solved by the Invention

However, in the prior art described above, neither of the two players can fully understand which game operation of one player has caused which additional guidance to be given to the other player about when to execute game operation. Thus, there is a problem in that the competing mood of the players cannot be satisfactorily encouraged.

The present invention has been made in view of the above problem, and it is therefore an object of the present invention to provide a game device, a game control method, and an information storage medium for satisfactorily encouraging mood of competition between players of a music game.

Means for Solving the Problems

In order to achieve the above-mentioned object, a game device according to the present invention, which causes each of a first player and a second player to execute game operations on a controller in time with game music, is characterized by including: operation timing obtaining means for obtaining timing of game operations executed by the first player and the second player; timing data storing means for storing timing data indicating a time when the first player is to execute game operation and a time when the second player is to execute game operation; first timing instruction image displaying means for displaying first timing instruction images in order to give guidance to the first player and the second player, separately, about when to execute game operation; second timing instruction image displaying means for displaying second timing instruction images in order to give guidance to the first player and the second player, separately, about when to execute game operation, the second timing instruction images being created based on the timing data which is stored in the timing data storing means, the second timing instruction images gradually approaching the first timing instruction images; game operation evaluating means for evaluating game operation executed by the first player and game operation executed by the second player by comparing game operation timing that is obtained by the operation timing obtaining means with timing that is represented by the timing data stored in the timing data storing means; and image moving means for gradually moving, depending on results of the evaluation made by the game operation evaluating means, a display position of the second timing instruction image that gives guidance to one of the first player and the second player about when to execute game operation toward a display position of the first timing instruction image that gives guidance to the other player about when to execute game operation, thereby newly adding timing at which the other player is to execute game operation.

Further, a game control method according to the present invention, which causes each of a first player and a second player to execute game operation on a controller in time with game music is characterized by including: an operation timing obtaining step of obtaining timing of game operations executed by the first player and the second player; a first timing instruction image displaying step of displaying first timing instruction images in order to give guidance to the first player and the second player, separately, about when to execute game operation; a second timing instruction image displaying step of displaying second timing instruction images in order to give guidance to the first player and the second player, separately, about when to execute game operation, the second timing instruction images being created based on timing data which is stored in timing data storing means, the timing data indicating a time when the first player is to execute game operation and a time when the second player is to execute game operation, the second timing instruction images gradually approaching the first timing instruction images; a game operation evaluating step of evaluating game operation that is executed by the first player and game operation that is executed by the second player by comparing game operation timing that is obtained in the operation timing obtaining step with timing that is represented by the timing data stored in the timing data storing means; and an image moving step of gradually moving, depending on results of the evaluation made in the game operation evaluation step, a display position of the second timing instruction image that gives guidance to one of the first player and the second player about when to execute game operation toward a display position of the first timing instruction image that gives guidance to the other player about when to execute game operation, thereby newly adding timing at which the other player is to execute game operation.

Further, a computer-readable information storage medium according to the present invention, which stores a program for causing each of a first player and a second player to execute game operation on a controller in time with game music and causing a computer to function as: operation timing obtaining means for obtaining timing of game operations executed by the first player and the second player; timing data storing means for storing timing data indicating a time when the first player is to execute game operation and a time when the second player is to execute game operation; first timing instruction image displaying means for displaying first timing instruction images in order to give guidance to the first player and the second player, separately, about when to execute game operation; second timing instruction image displaying means for displaying second timing instruction images in order to give guidance to the first player and the second player, separately, about when to execute game operation, the second timing instruction images being created based on the timing data which is stored in the timing data storing means, the second timing instruction images gradually approaching the first timing instruction images; game operation evaluating means for evaluating game operation executed by the first player and game operation executed by the second player by comparing game operation timing that is obtained by the operation timing obtaining means with timing that is represented by the timing data stored in the timing data storing means; and image moving means for gradually moving, depending on results of the evaluation made by the game operation evaluating means, a display position of the second timing instruction image that gives guidance to one of the first player and the second player about when to execute game operation toward a display position of the first timing instruction image that gives guidance to the other player about when to execute game operation, thereby newly adding timing at which the other player is to execute game operation. This program may be stored in various computer-readable information storage media including CD-ROMs, DVD-ROMs, and ROM cartridges. The computer is, for example, a home-use gaming machine, a business-use gaming machine, a portable gaming machine, a cellular phone, a personal computer, or a server computer.

In the present invention, the first player and the second player are each evaluated for how well they execute game operation. Depending on the evaluation results, the display position of a second timing instruction image for guiding one of the first and second players in the decision of when to execute game operation is moved to the display position of a first timing instruction image for guiding the other of the players in the decision of when to execute game operation. For example, depending on the result of evaluating game operation of the first player, the display position of the second timing instruction image for giving game operation guidance to the first player is moved to the display position of the first timing instruction image for giving game operation guidance to the second player. The display position of the second timing instruction image for giving game operation guidance to the second player is moved to the display position of the first timing instruction image for giving game operation guidance to the first player, depending on the result of evaluating game operation of the second player. Furthermore, in the present invention, timing at which the other player should execute game operation is newly added. According to the present invention, the second timing instruction image for guiding one player in the decision of when to execute game operation provides guidance about the newly added timing at which the other player should execute game operation. This enables a player to easily understand which second timing instruction image displayed to their opponent player has caused which timing to be added. The present invention can thus provoke a competitive mood between the players.

According to an aspect of the present invention, the timing data storing means further stores candidate timing data which indicates one or more candidates of timing to be added by the image moving means, and the image moving means gradually moves the second timing instruction image for guiding one of the players in the decision of when to execute game operation, toward the display position of the first timing instruction image for guiding the other of the players in the decision of when to execute game operation, via a display position for one of timing candidates indicated by the candidate timing data stored in the timing data storing means. In this way, the other player can be given an additional chance to execute game operation in time with game music. The candidate timing data is set such that the additional timing does not coincide with other timing presented to the other player. Overlapping of timing to execute game operation is thus prevented.

BEST MODE FOR CARRYING OUT THE INVENTION

An embodiment of the present invention is described in detail below with reference to the drawings.

Figure 1:
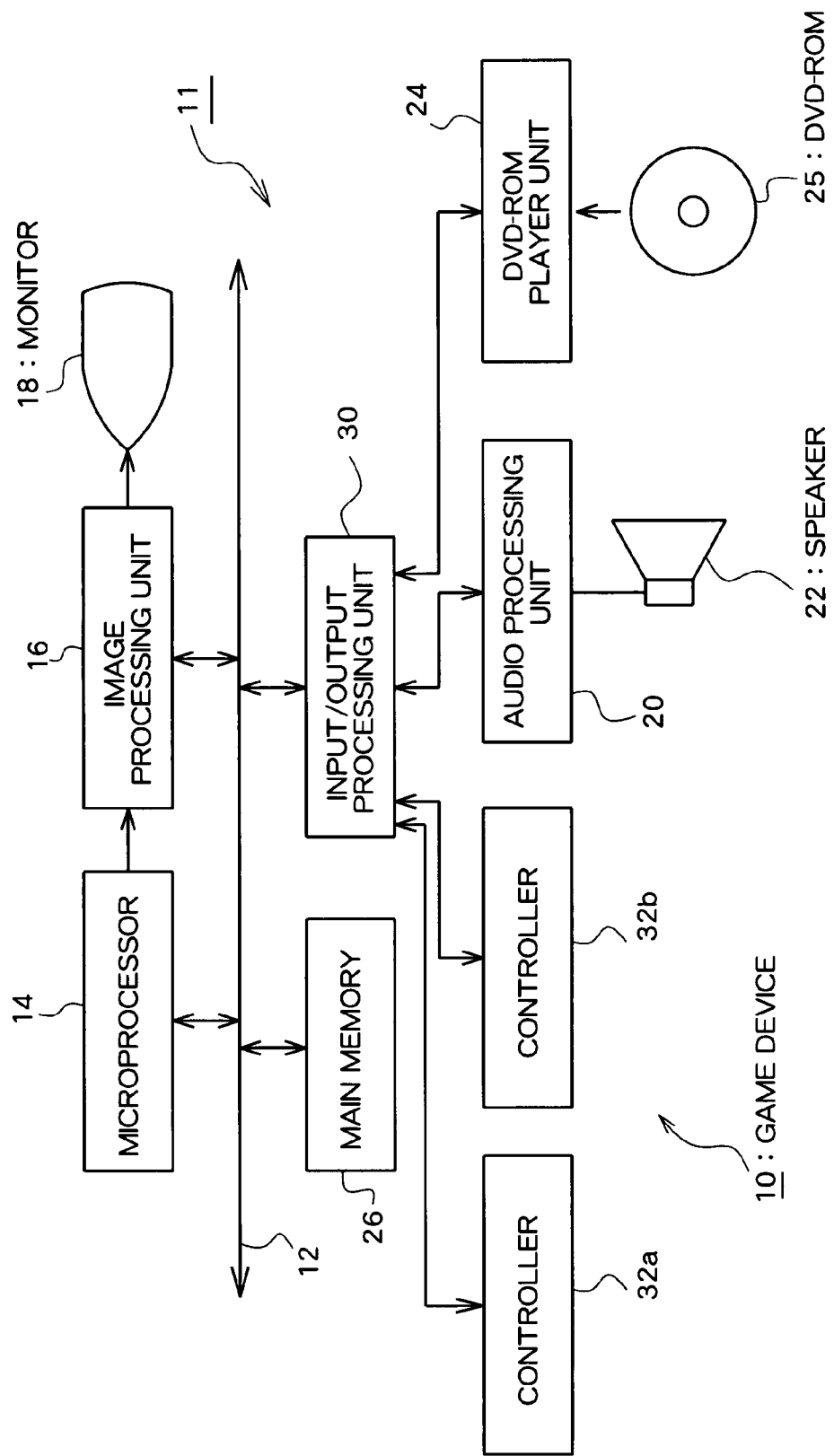
FIG. 1 is a diagram showing the hardware configuration of a game device according to an embodiment of the present invention.

FIG. 1 is a diagram showing the hardware configuration of a game device according to the embodiment of the present invention. The game device shown in FIG. 1 is denoted by reference numeral 10 and is structured such that a DVD-ROM 25, which is a computer-readable information storage medium, is loaded in a home-use gaming machine 11, which is connected to a monitor 18 and a speaker 22. The home-use gaming machine 11 is, for example, a known computer game system. Here, the DVD-ROM 25 stores a game program and game data for a music game that has a competing play mode, and dedicated controllers are connected as controllers 32a and 32b so that two players can enjoy the competing play mode of the music game played on the game device 10. Instead of the DVD-ROM 25, other various information storage media including CD-ROMs and ROM cartridges may be employed to provide the game program and the game data to the home-use gaming machine 11. The game program and the game data may also be provided to the home-use gaming machine 11 from a remote site via a communication network.

The home-use gaming machine 11 has a microprocessor 14, an image processing unit 16, a main memory 26, and an input/output processing unit 30, which are connected by a bus 12 in a manner that allows them to communicate data with one another. The controllers 32a and 32b, an audio processing unit 20, and a DVD-ROM player unit 24 are connected to the input/output processing unit 30. Other components of the home-use gaming machine 11 besides the controllers 32a and 32b are housed in a casing. A household television set, for example, is employed as the monitor 18, and employed as the speaker 22 is, for example, a built-in speaker of the television set.

The microprocessor 14 controls the components of the home-use gaming machine 11 in accordance with an operating system stored in a not-shown ROM and the game program read out of the DVD-ROM 25. The bus 12 enables the components of the home-use gaming machine 11 to exchange addresses and data. The game program and the game data that are read out of the DVD-ROM 25 are written in the main memory 26 as required. The image processing unit 16 contains a VRAM in which a game screen is drawn from image data sent by the microprocessor 14. The image processing unit 16 converts the game screen into video signals and outputs the video signals to the monitor 18 on a given schedule.

The input/output processing unit 30 is an interface for relaying data communications of the microprocessor 14 to and from the controllers 32a and 32b, the audio processing unit 20, and the DVD-ROM player unit 24. The controllers 32a and 32b are input units with which players execute game operation, and two controllers are prepared for competing play. The input/output processing unit 30 regularly (e.g., at 1/60 second intervals) scans the operation state of buttons on the controllers 32a and 32b, and sends operation signals indicating the scan results to the microprocessor 14 via the bus 12. The microprocessor 14 obtains from the operation signals the type and timing of game operation executed by the players. The audio processing unit 20 contains a sound buffer, which temporarily stores data of music, game sound effects, and the like that are read out of the DVD-ROM 25. The audio processing unit 20 reproduces the temporarily stored data and outputs the data from the speaker 22. The DVD-ROM player unit 24 follows an instruction from the microprocessor 14 in reading the game program, the game data, and other data recorded in the DVD-ROM 25.

Figure 2:
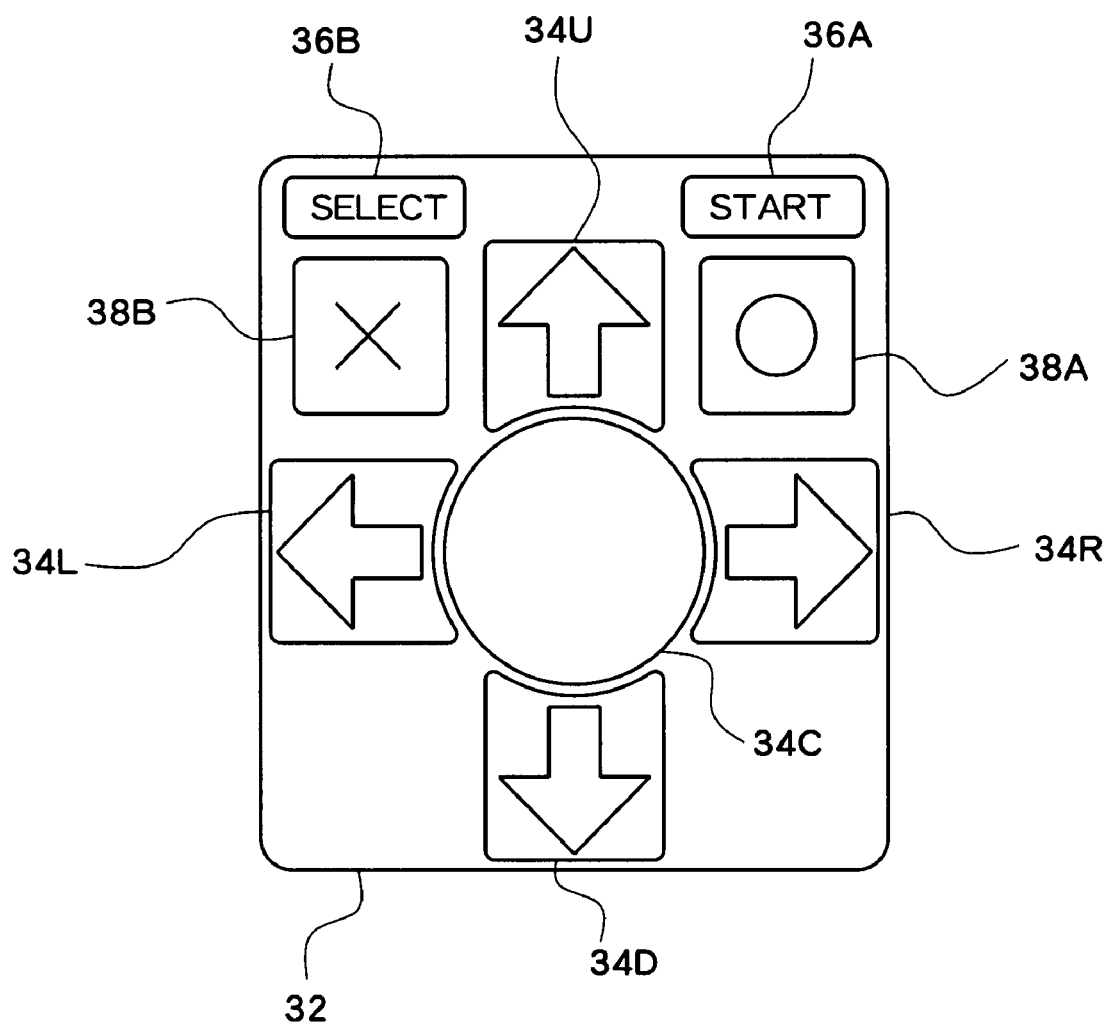
FIG. 2 is a diagram showing an example of a controller.

FIG. 2 is a diagram showing an example of the controllers 32a and 32b. The controllers 32a and 32b have the same shape and configuration, and FIG. 2 shows an example thereof. The controller 32 shown in FIG. 2 is a dedicated controller that is specially prepared for the playing of music games, and is constituted of a mat-like member large enough to be suitable as a dance stage. When a player steps onto the controller 32, operation signals indicating the position(s) of the player's foot (feet) on the controller 32 are sent to the home-use gaming machine 11. As shown in FIG. 2, the controller 32 has, at the center of its front surface, a central area 34C which is a substantially circular sectioned area. Other sectioned areas, namely, directional button input areas 34U, 34D, 34L, and 34R are above and below the central area 34C, and to the left and right of the central area 34C, respectively. Sectioned areas to the right and left of the directional button input area 34U are a circle button input area 38A and a cross button input area 38B, respectively. A sectioned area above the circle button input area 38A is a start button input area 36A. A sectioned area above the cross button input area 38B is a select button input area 36B. A right-pointing arrow pattern is shown in the directional button input area 34R. A left-pointing arrow pattern is shown in the directional button input area 34L. An upward-pointing arrow pattern is shown in the directional button input area 34U. A downward-pointing arrow pattern is shown in the directional button input area 34D. A circular mark (O) is shown in the circle button input area 38A. A cross mark (X) is shown in the cross button input area 38B. A string of letters "START" is shown in the start button input area 36A. A string of letters "SELECT" is shown in the select button input area 36B.

Sensors are buried under the directional button input areas 34U, 34D, 34L, and 34R, the circle button input area 38A, the cross button input area 38B, the start button input area 36A, and the select button input area 36B. When a player's foot is put on one of the input areas, a message to that effect is sent as an operation signal to the home-use gaming machine 11. The directional button input areas 34U, 34D, 34L, and 34R are used mainly for inputting dance steps, and also for selecting various menus. The start button input area 36A is used to start the game, confirm various choices, and the like. The select button input area 36B is used mainly for calling up various menu screens. The circle button input area 38A is used mainly to confirm various choices. The cross button input area 38A is used to cancel various decisions, and to forcedly end the game.

Figure 3:
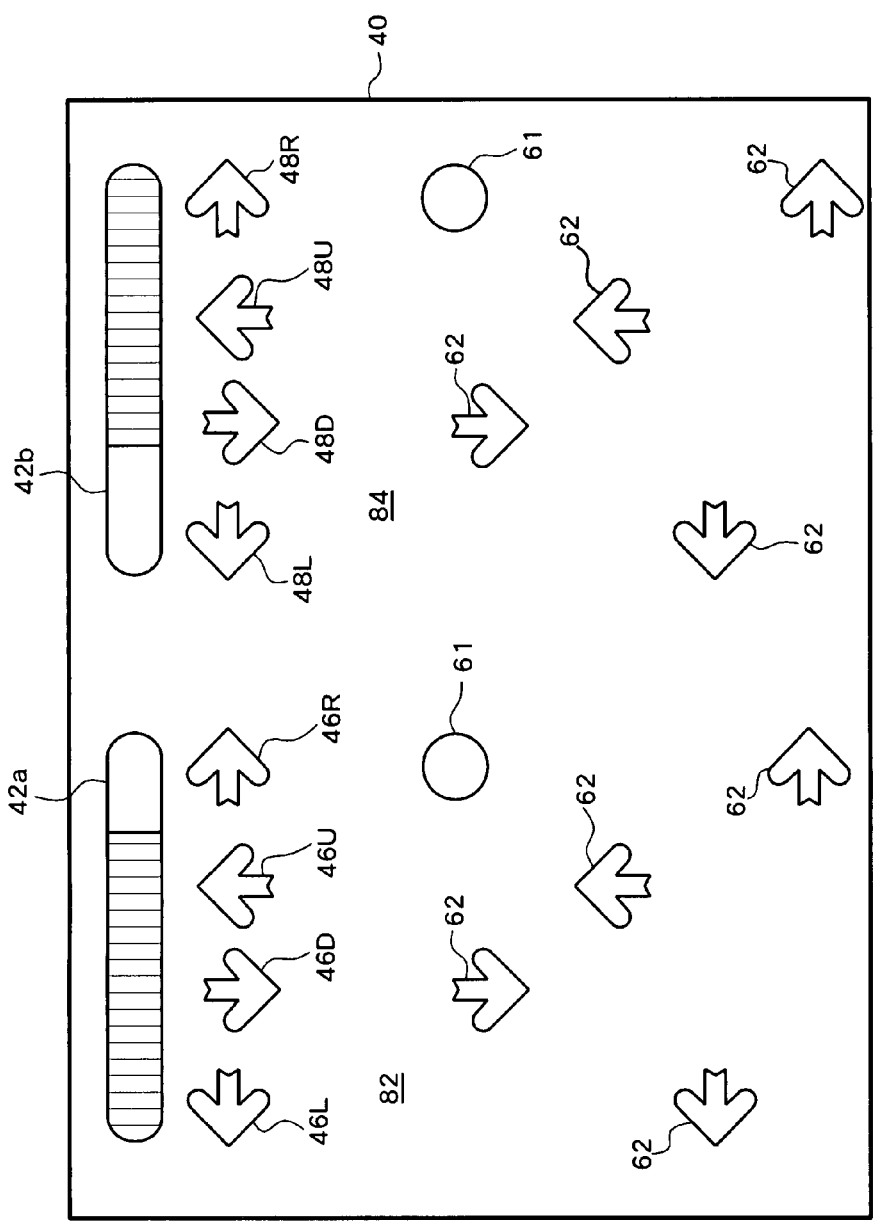
FIG. 3 is a diagram showing an example of a game screen.

FIG. 3 is a diagram showing an example of a game screen that is displayed on the monitor 18 based on the game program and the game data that are read out of the DVD-ROM 25. The game screen shown in FIG. 3 is denoted by reference numeral 40, and a not-shown background image is displayed on the entire game screen 40. A first player display area 82 and a second player display area 84 are disposed on the left hand side and the right hand side of the game screen 40, respectively. The first player display area 82 is a display area mainly for guiding a first player in the decision of when to step, and the second player display area 84 is a display area mainly for guiding a second player in the decision of when to step.

In an upper part of the first player display area 82, reference arrow marks (first timing instruction images) 46L, 46D, 46U, and 46R are lined up side by side. Displayed below the reference arrow marks are multiple timing guide arrow marks 62 and a special timing guide arrow mark 61 (second timing instruction images), which move upward as the time elapses. Similarly, in the second player display area 84, reference arrow marks (first timing instruction images) 48L, 48D, 48U, and 48R are lined up side by side in an upper part whereas multiple timing guide arrow marks 62 and a special timing guide arrow mark 61 (second timing instruction images), which move upward as the time elapses, are displayed below the reference arrow marks.

The reference arrow marks 46L and 48L are associated with the directional button input area 34L. The reference arrow marks 46D and 48D are associated with the directional button input area 34D. The reference arrow marks 46U and 48U are associated with the directional button input area 34U. The reference arrow marks 46R and 48R are associated with the directional button input area 34R. At the time when the timing guide arrow marks 62 or the special timing guide arrow mark 61 overlaps the reference arrow marks 46L, 46D, 46U, and 46R, the first player steps on one or more of the directional button input areas 34L, 34D, 34U, and 34R that are associated with the overlapped reference arrow marks 46L, 46D, 46U, and 46R. The first player thus obtains a high evaluation score and is allowed to extend a first player gauge 42a. At the time when the timing guide arrow marks 62 or the special timing guide arrow mark 61 overlaps the reference arrow marks 48L, 48D, 48U, and 48R, the second player steps on one or more of the directional button input areas 34L, 34D, 34U, and 34R that are associated with the overlapped reference arrow marks 48L, 48D, 48U, and 48R. The second player thus obtains a high evaluation score and is allowed to extend a second player gauge 42b. FIG. 3 shows a situation in which the first and second players are requested to step on the directional button input areas 34R, 34D, 34U, and 34L in order. When a time at which a player is requested to step arrives, a message (not shown) indicating how well or poorly the player has executed the game operation is displayed below the reference arrow marks 46 or 48. Specifically, a message reflecting the degree of matching between the guided step position and timing and the player's actual step position and timing is displayed. Examples of the message include "PERFECT", "GREAT", "GOOD", and "BOO" in descending order of the matching degree.

Players are not necessarily required to operate the controllers 32 at the exact time when the timing guide arrow marks 62 or the special timing guide arrow marks 61 overlap the reference arrow marks 46 and 48 in order to obtain a positive evaluation score. An evaluation score according to the degree of matching between the marks is given. In both the first player display area 82 and the second player display area 84, the timing guide arrow marks 62 and the special timing guide arrow marks 61 are displayed in accordance with common step data, which will be described later.

The timing guide arrow marks 62 and the special timing guide arrow marks 61 are specifically displayed as follows. For example, in the case where the guidance display range is set such that timing guidance is displayed for steps to be stepped in one measure from the present time, when the game music starts to be played, the microprocessor 14 reads, from step data, step timing contained within the guidance display range. Based on the step data, the microprocessor 14 creates image data representing the timing guide arrow marks 62 and the special timing guide arrow marks 61. The image data contains display positions adjusted such that a mark for the earliest step timing is displayed in the uppermost part of the game screen while marks for subsequent step timing are displayed below the mark for the earliest step timing in chronological order. This processing is repeated in given cycles.

In the processing, the timing guide arrow mark 62 and the special timing guide arrow mark 61 that indicate when to step on the directional button input area 34L are displayed below the reference arrow mark 46L. The timing guide arrow mark 62 and the special timing guide arrow mark 61 that indicate when to step on the directional button input area 34D are displayed below the reference arrow mark 46D. The timing guide arrow mark 62 and the special timing guide arrow mark 61 that indicate when to step on the directional button input area 34U are displayed below the reference arrow mark 46U. The timing guide arrow mark 62 and the special timing guide arrow mark 61 that indicate when to step on the directional button input area 34R are displayed below the reference arrow mark 46R. The timing guide arrow mark 62 and the special timing guide arrow mark 61 that indicate when to step on the directional button input area 34L are displayed below the reference arrow mark 48L. The timing guide arrow mark 62 and the special timing guide arrow mark 61 that indicate when to step on the directional button input area 34D are displayed below the reference arrow mark 48D. The timing guide arrow mark 62 and the special timing guide arrow mark 61 that indicate when to step on the directional button input area 34U are displayed below the reference arrow mark 48U. The timing guide arrow mark 62 and the special timing guide arrow mark 61 that indicate when to step on the directional button input area 34R are displayed below the reference arrow mark 48R.

The head of the guidance display area, in other words, the display position of the reference arrow marks 46 and 48 (the position in the vertical direction of the screen), corresponds to what part of the game music is being played at that point in time. The guidance display range is moved from the start of the tune toward the end of the tune. In this way, the timing guide arrow marks 62 and the special timing guide arrows 61 are gradually moved upward as the tune progresses. Causing the timing guide arrow marks 62 and the special timing guide arrow marks 61 to gradually approach the reference arrow marks 46 and 48 in this manner enables players to easily recognize on the game screen 40 how soon step timing will arrives.

The special timing guide arrow marks 61 will now be described. In the game device 10, the special timing guide arrow marks 61 are displayed in both the first player display area 82 and the second player display area 84 in accordance with common step data. The special timing guide arrow marks 61 can be displayed below any of the reference arrow marks 46L, 46D, 46U, 46R, 48L, 48D, 48U, and 48R.

Figure 4:
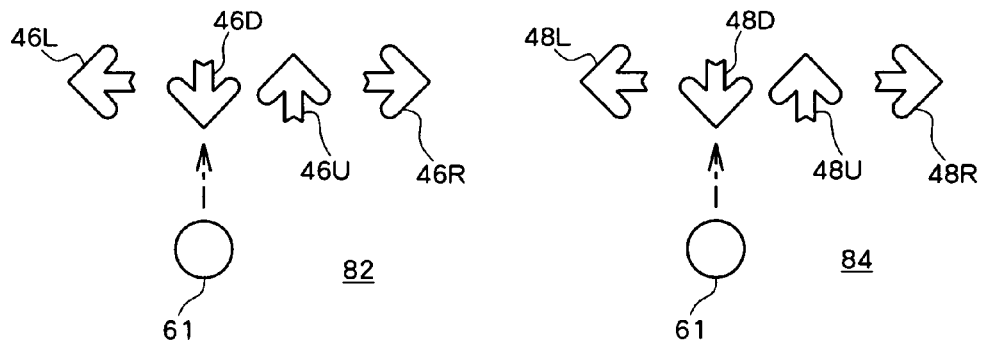
FIG. 4 is a diagram showing movement of special timing guide arrow marks.
Figure 5:
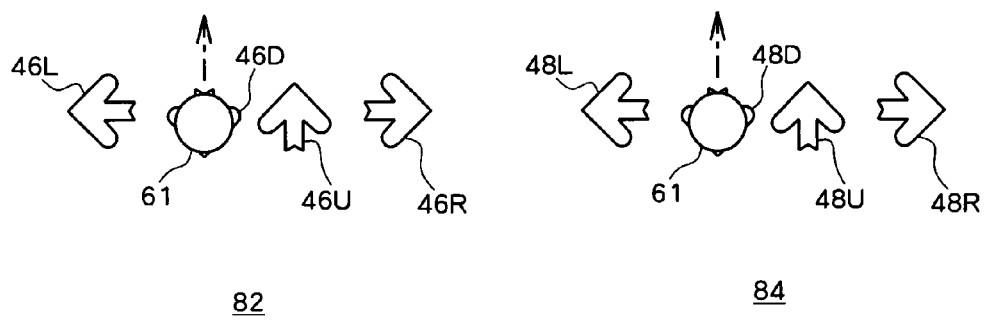
FIG. 5 is a diagram showing the movement of the special timing guide arrow marks.
Figure 6:
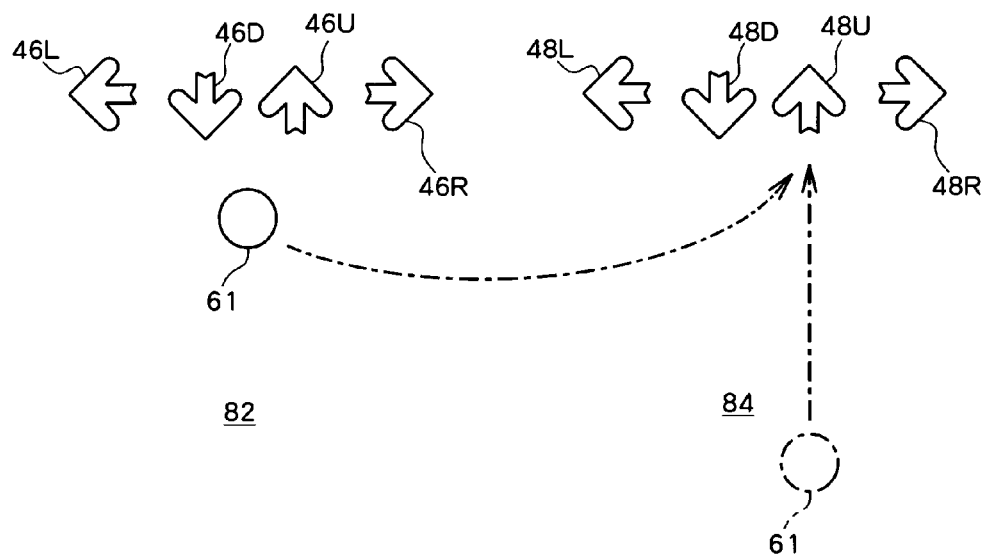
FIG. 6 is a diagram showing the movement of the special timing guide arrow marks.

As shown in FIG. 4, the special timing guide arrow marks 61 are displayed in both the first player display area 82 and the second player display area 84, and move upward on the screen as playing of the game music progresses to gradually approach the respective reference arrow marks 46 and 48 that are associated with the same directional button input area 34. Subsequently, the players are respectively evaluated for their game operation during an evaluation period which stretches before and beyond time points where the special timing guide arrow marks 61 overlap the reference arrow marks 46 and 48 as shown in FIG. 5. In the case where the players do not execute game operation associated with the overlapped reference arrow marks 46 and 48 within the evaluation period, the special timing guide arrow marks 61 continue to move upward on the screen as indicated by the dot-dash lines of FIG. 5, and eventually disappear off the game screen. On the other hand, in the case where the players execute, within the evaluation period, game operation that is associated with the reference arrow marks 46 and 48 on which the special timing guide arrow marks 61 are overlaid, the special timing guide arrow mark 61 in question travels along a parabolic trajectory as shown in FIG. 6, and enters the other player's display area (the second player display area 84 in this case) to gradually move to the display position of one of the area's reference arrow marks. In short, the special timing guide arrow mark 61 travels along the above-mentioned parabolic trajectory in one direction.

This game device 10 uses such gradual movement of the special timing guide arrow mark 61 along a parabolic trajectory to present the other player new timing. The step data described above contains candidate timing data, which represents additional timing to be presented to the respective players, and a circle drawn in the dot-dash line of FIG. 6 indicates a display position for timing that is represented by the candidate timing data. In this embodiment, a destination to which this display position travels is calculated, and the display position of the special timing guide arrow mark 61 that has entered the other player's display area arrives at the calculated position. After arriving at the calculated position, the special timing guide arrow mark 61 gradually approaches the relevant reference arrow mark along the trajectory of a display position for one of the timing candidates represented by the candidate timing data. The special timing guide arrow mark 61 thus moves out of one player's display area, travels through a display position for one of the timing candidates represented by the candidate timing data, and then gradually approaches the position of the relevant reference arrow mark in the other player's display area.

FIG. 6 shows a state in which the first player alone has succeeded, through proper game operation, in causing the special timing guide arrow mark 61 to enter the second player display area 84 whereas the second player has failed in causing the special timing guide arrow mark 61 to enter the first player display area 82. In the case where both players execute game operation properly, the special timing guide arrow mark 61 moves from the second player display area 84 toward the first player display area 82, and at the same time the special timing guide arrow mark 61 moves from the first player display area 82 toward the second player display area 84.

Figure 7:
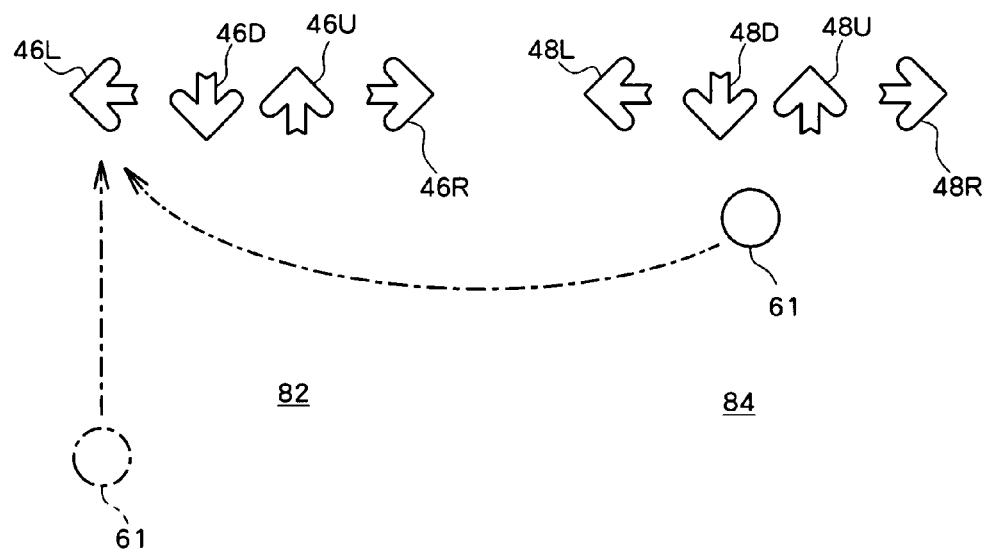
FIG. 7 is a diagram showing the movement of the special timing guide arrow marks.

In the case where one player executes game operation properly at timing indicated by the special timing guide arrow mark 61, thereby causing additional timing to be presented, and the other player executes game operation properly at the additional timing, the special timing guide arrow mark 61 in question moves to the other player's display area as shown in FIG. 7. The special timing guide arrow mark 61 thus moves back and forth between the player display areas 82 and 84 as long as the first and second players keep executing game operation properly at sequentially presented additional timing. How many times the special timing guide arrow mark 61 shuttle between the player display areas 82 and 84 may be unlimited or limited.

Data stored in the DVD-ROM 25 will now be described. The DVD-ROM 25 stores a game program, various types of game sound effects data, and various types of game image data, as well as game music data, in order to make the home-use gaming machine 11 function as a music game.

Figure 8:
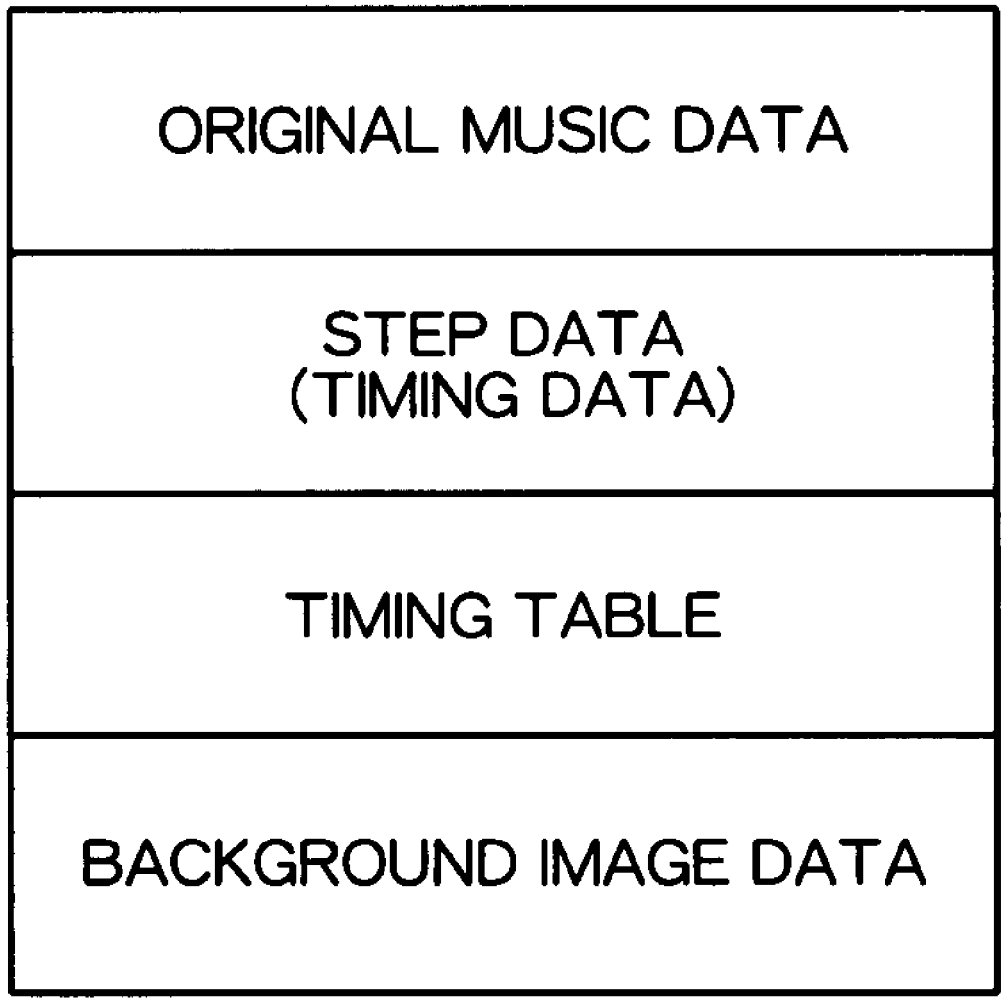
FIG. 8 is a diagram showing a configuration of game music data.

FIG. 8 is a diagram illustrating game music data that corresponds to specific game music and is stored in the DVD-ROM 25. As shown in this figure, the game music data contains original music data, step data, a timing table, and background image data. The original music data is, for example, generally-available popular music or the like saved as original music in a given data stream format. The DVD-ROM player unit 24 reads the original music data in accordance with an instruction from the microprocessor 14, and performs data processing on the original music data if necessary. The DVD-ROM player unit 24 is capable of supplying the read (and processed) original music data directly to the audio processing unit 20 instead of sending the data over the bus 12. After receiving the data directly from the DVD-ROM player unit 24, the audio processing unit 20 subjects the data to D/A conversion, and supplies the converted data to the speaker 22.

The step data defines timing at which a player should step (execute game operation) while the corresponding game music is played. The step data reflects rhythms of the corresponding game music. Multiple sets of step data may be prepared for one piece of game music so that different step data sets are used for different difficulty levels, play modes, or the like. The step data specifies which directional button input area 34 of the controller 32 should be stepped on at which beat in the case where a measure of the corresponding game music is divided into a given number of beats, for example, four beats, or eight beats.

The timing table is prepared in order to time the step data with the game music. The microprocessor 14 consults the timing table to identify which step data corresponds to a part of the game music that is currently being played. The background image data represents an image that is displayed as the background of the game screen 40 shown in FIG. 3, for example. The background image data may be animated image data or still image data. For each piece of game music, a background image that fits the feel of the game music is chosen to provide visual help in putting players in the mood. Background images represented by the background image data may be overlaid with other images such as an image of a game character that a player chooses.

Figure 9:
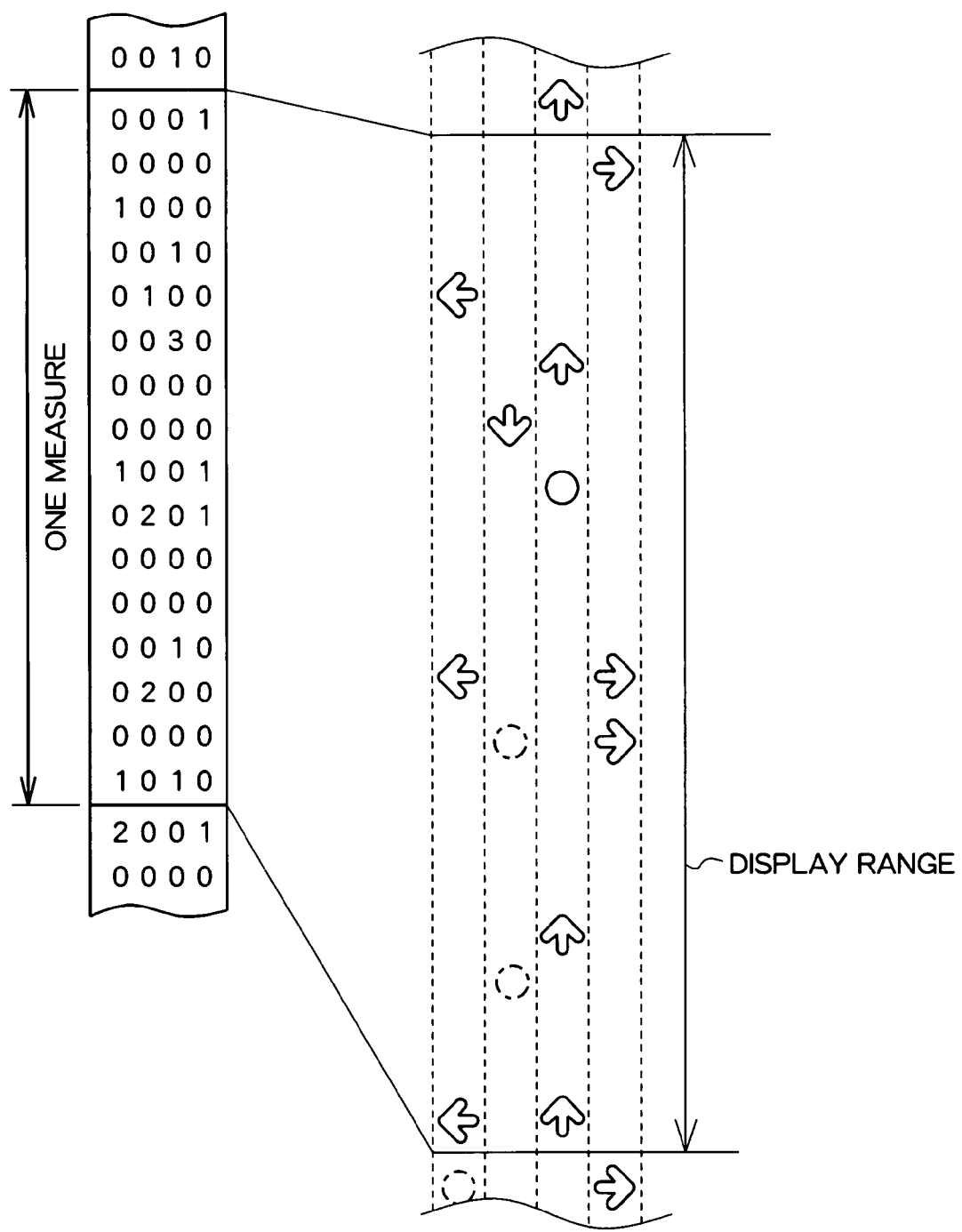
FIG. 9 is a diagram illustrating a procedure of compositing timing guide arrow mark images from step data.

Processing of displaying the timing guide arrow marks 62 and the special timing guide arrow marks 61 based on the step data will now be described. FIG. 9 is a diagram showing an example of the step data. The data format of the step data here is determined such that step timing is specified on a $^{1}/_{16}$-th measure basis. A step at each $^{1}/_{16}$-th measure is identified by four items of data. Each of the four items of data is associated with one of the directional button input areas 34, and "0" indicates the directional button input area 34 in question should not be stepped on whereas "1" and "3" indicate that the directional button input area 34 in question should be stepped on. "2" indicates that it is the above-described candidate timing data which represents additional timing to be presented to players. In the case where the guidance display range is one measure, the display positions of the timing guide arrow marks 62 are determined such that successive steps in one measure are arranged all over the first player display area 82 and the second player display area 84, and images of the timing guide arrow marks 62 are composited for each of the first player display area 82 and the second player display area 84 on the game screen 40.

As described above, if one player executes game operation properly at the timing indicated by the special timing guide arrow mark 61, the special timing guide arrow mark 61 in question moves toward a position for one of the timing candidates represented by the above-described candidate timing data which is a display position within the other player's display area. The timing associated with the position that is the destination of this special timing guide arrow mark 61 is presented to the other player as additional timing. In the case where there is no special timing guide arrow mark 61 displayed on the game screen, a new special timing guide arrow mark 61 is displayed on the game screen in order to give guidance to a player about timing represented by candidate timing data.

Figure 10:
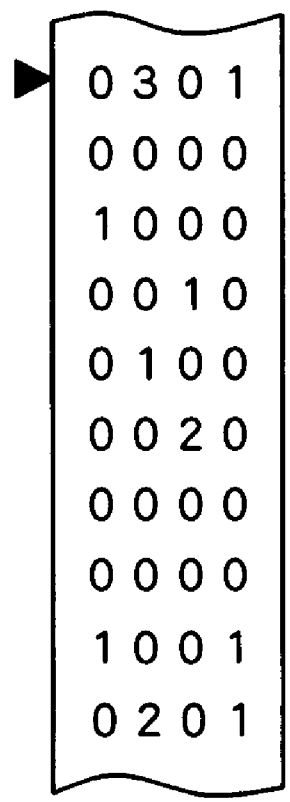
FIG. 10 are diagrams showing a change in step data caused by a shift of the special timing guide arrow marks.
Figure 10:
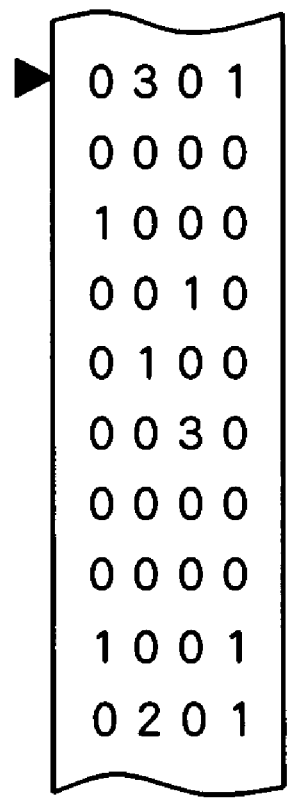

This game device 10 reads the above step data onto the main memory 26 during the game and, in accordance with the read step data, suitably selects timing that is to be actually presented to players, and stores the selected timing. Specifically, in the case where there is no special timing guide arrow mark 61 displayed on the game screen, timing that is closest to the current timing is chosen from among timing associated with data in the step data that has the value "2", and the value of data that is associated with the chosen timing is changed from "2" to "3". In the case where one player executes game operation properly at the timing indicated by the special timing guide arrow mark 61, timing that is closest to the current timing is chosen from among timing associated with data in the step data that has the value "2", and the value of data that is associated with the chosen timing is changed from "2" to "3". Additional timing to execute game operation is thus presented to a player. FIG. 10 show a data change that is caused by this. FIG. 10(*a*) shows the step data prior to an addition of timing whereas FIG. 10(*b*) shows the step data after the addition of timing, and black triangles each indicate the current playing position in the step data.

Figure 11:
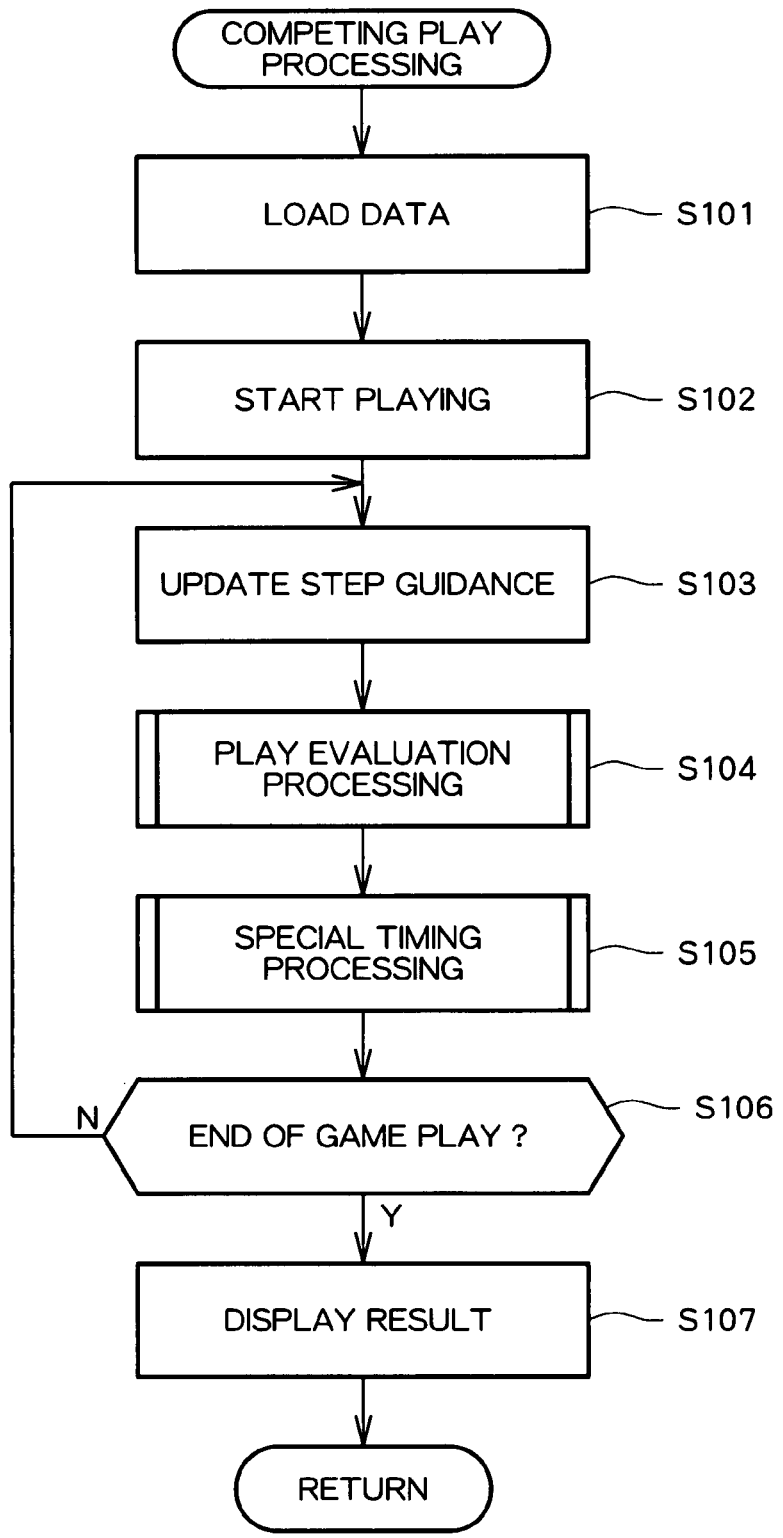
FIG. 11 is a flow chart showing competing play processing of the game device according to the embodiment of the present invention.
Figure 12:
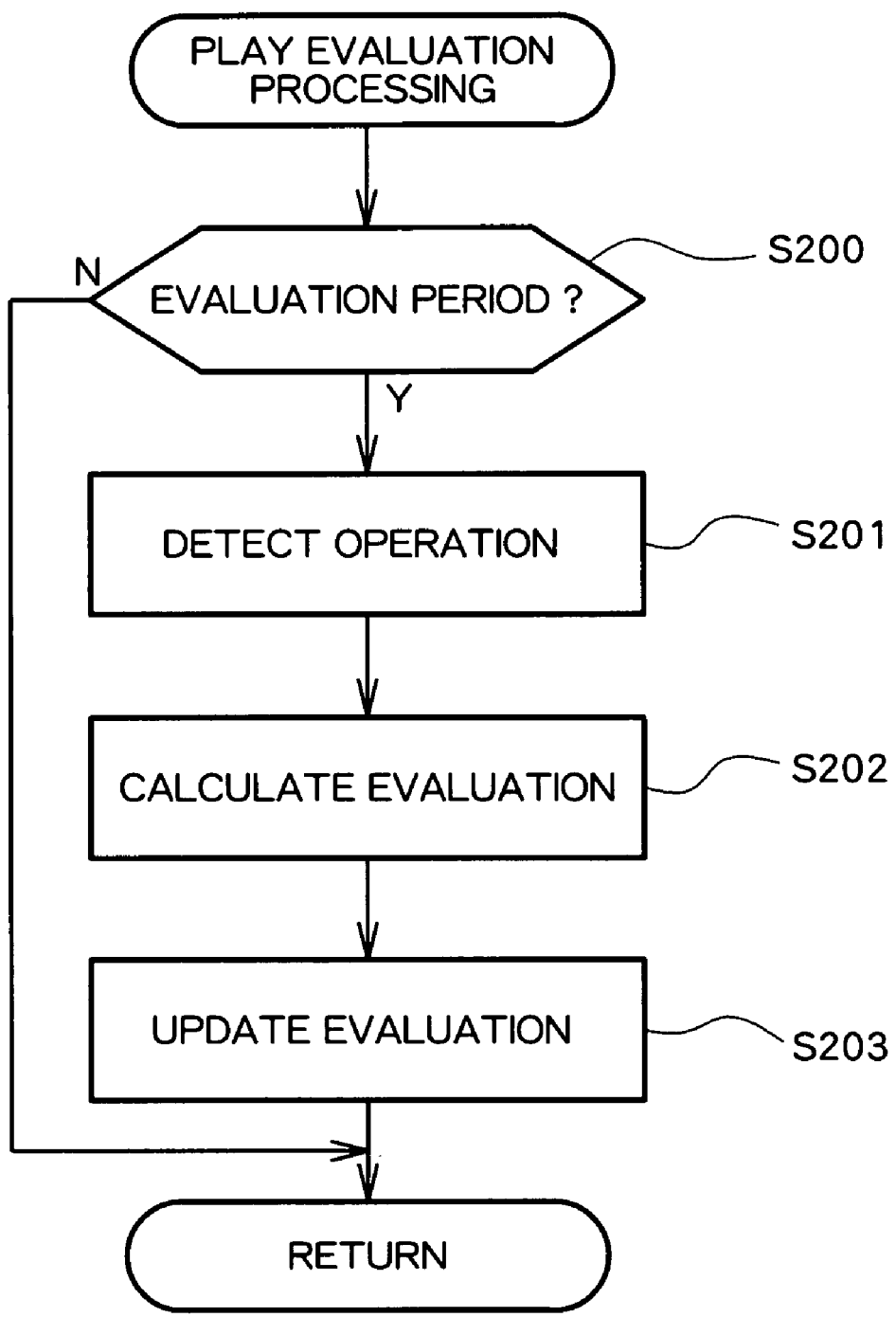
FIG. 12 is a flow chart showing play evaluation processing.
Figure 13:
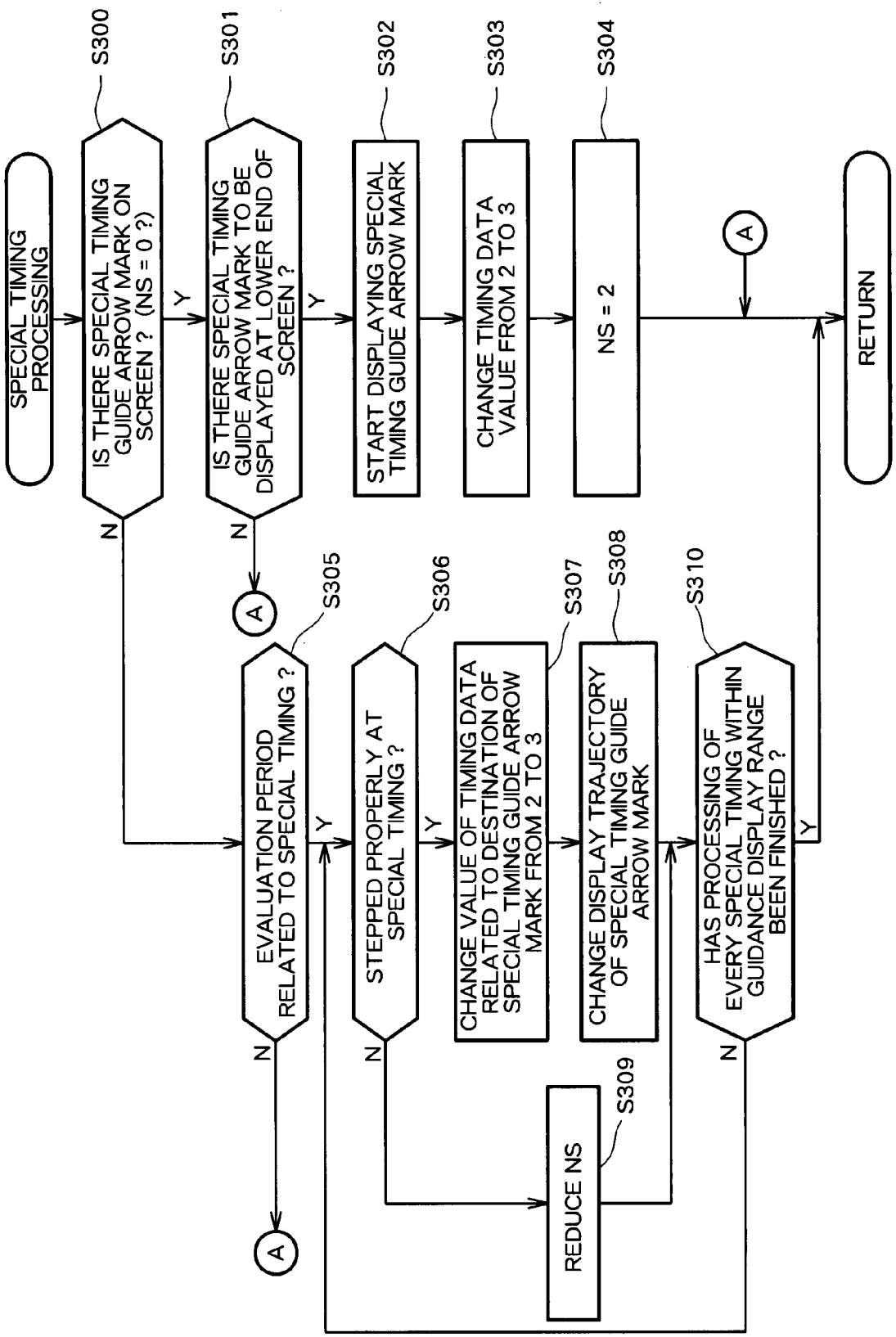
FIG. 13 is a flow chart showing special timing processing.

Processing of a game program executed by the home-use gaming machine 11 will now be described. FIGS. 11 through 13 are flow charts illustrating processing of the game program stored in the DVD-ROM 25. When a player places the DVD-ROM 25 in the DVD-ROM player unit 24 and powers the home-use gaming machine 11 on, the operating system stored in the ROM (not shown) is executed first and various initialization operations are performed. At this point, a part of the game program stored in the DVD-ROM 25 that is necessary for the immediate processing is loaded onto the main memory 26. A game title and the like are displayed on the monitor 18 in accordance with the game program, and then a main menu is displayed automatically or in response to operation of the controller 32. If the player chooses a "competing play mode" on the main menu and selects game music, game processing for the "competing play mode" is started.

In this processing, data related to the game music that has been chosen by the player is loaded first (S101). Specifically, a group of data shown in FIG. 8 is loaded. Of the loaded data, the original music data is sent from the DVD-ROM player unit 24 directly to the audio processing unit 20, and reproduction output is immediately started ($S_{102}$). The rest of the data group is loaded onto the main memory 26.

Next, based on the step data in the read game music data, the microprocessor 14 creates image data for step guidance as shown in FIG. 3, for example, and outputs the step guidance image data to the monitor 18, thereby updating step guidance (S103). Specifically, step guidance image data is created/updated based on the position of data within the display range that has the value "1" out of the step data. The microprocessor 14 uses the timing table in judging the association relation between the step data and the original music data.

Play evaluation processing is then executed (S104). FIG. 12 is a flow chart illustrating the play evaluation processing. As shown in the figure, the first step of the play evaluation processing is to judge whether or not the current playing position belongs to an evaluation period from the current playing position and the step data (S200). An evaluation period is a period in which a player's step timing is compared with timing defined in the step data. If any of data in the step data associated with one instant has the value "1" or "3", a given length of time which stretches before and beyond the instant is set as an evaluation period.

In the case where the current playing position belongs to an evaluation period, the operation state of the controllers 32a and 32b of the respective players is obtained (S201), and steps of the respective players are evaluated based on the obtained operation state (S202). On which of the directional button input areas 34L, 34U, 34D, and 34R the step that is currently in the evaluation period is made can be known from the step data. Therefore, it is judged here whether or not one of the directional button input areas 34L, 34U, 34D, and 34R that is an evaluation subject is actually stepped on, and it is examined how much the timing at which the area is stepped on is off from the timing that is defined by the step data. When the deviation amount is smaller, a higher evaluation score is given. For instance, the highest evaluation score is given when the deviation amount is zero, a zero evaluation score is given when the deviation amount is maximum, and a minus evaluation score is given in the case where a wrong or no directional button input area 34 is stepped on. In the case where steps made on more than one directional button input area 34 are evaluation subjects, the steps are evaluated in the same manner for each of the directional button input areas 34 stepped on.

Messages reflecting the evaluation results are displayed below the reference arrow marks 46 and 48, and the display state of the first player gauge 42a and the second player gauge 42b is updated in accordance with the evaluation results (S203).

The description returns to FIG. 11. After that, special timing processing for displaying the special timing guide arrow marks 61 on the game screen is executed (S105). The microprocessor 14 then judges whether or not the game play meets an ending condition (S106). Specifically, the game is ended when a player keeps depressing the start button input area 36A of the controller 32 for a given length of time (in this case, the play is "interrupted" and returns to a selection screen for selecting characters or the like), or when the tune that has been played comes to an end. The game may also be ended when one of the first player gauge 42a and the second player gauge 42b is extended to the maximum length (100%) whereas the other vanishes from the screen (0%). In the case where the game play meets the ending condition, win-loss is displayed in accordance with the player's evaluation results stored in the main memory 26 (S107), and the competing play processing is ended. On the other hand, when it is judged that the game play does not meet the ending condition, the processing returns to Step S103.

FIG. 13 is a flow chart showing the special timing processing for the game device 10. The flow chart shown in the figure shows details of the processing of Step S105 of FIG. 12. As shown in the figure, the first step of this processing is to judge whether or not at least one special timing guide arrow mark 61 is being displayed on the game screen (S300). Specifically, during the competing play the game device 10 manages, in the main memory 26, a variable NS which indicates how many special timing guide arrow marks 61 are being displayed on the game screen, and checks in Step S300 whether or not the value of the variable NS is 0. If there is at least one special timing guide arrow mark 61 displayed on the game screen, the game device 10 moves to processing of Step S305.

If there is no special timing guide arrow mark 61 displayed on the game screen, it is judged whether or not any special timing guide arrow mark 61 that should be displayed at a lower end of the game screen has been generated (S301). In other words, the game device 10 judges whether or not the snap data contains data having the value "2" at a lower end (opposite to the current playing position) of a display range judged from the current playing position. The processing is ended if the data having the value "2" is not found. If the data having the value "2" is found, the special timing guide arrow marks 61 start to be displayed in the first player display area 82 and the second player display area 84 both (S302). Thereafter, the value of the data in the timing data that is associated with the special timing guide arrow mark 61 that has started to be displayed in Step S302 is changed from "2" to "3" (S303). The value of the variable NS is set to 2 (S304), and then the processing is ended.

In Step S305, the game device 10 judges whether or not the current timing belongs to an evaluation period related to timing about which guidance is given by the special timing guide arrow mark 61 that is being displayed on the game screen. This judgment is made based on the judgment made in Step S200. In the case where the current timing does not belong to the evaluation period, the processing is ended.

In the case where the current timing belongs to the evaluation period related to the timing about which guidance is given by the special timing guide arrow mark 61, timing about which guidance is given by one of the special timing guide arrow marks 61 displayed on the game screen is compared with the actual timing of game operation to judge whether or not the deviation amount between the two is smaller than a given amount (S306). In the case where the deviation amount is less than the given amount, the destination of the special timing guide arrow mark 61 in question is chosen from among timing candidates represented by the candidate timing data which is contained in the step data, and the value of the data related to the chosen timing is changed from "2" to "3" (S307). The trajectory of the display position of the special timing guide arrow mark 61 is then changed (S308). When changing the trajectory of the display position of the special timing guide arrow mark 61, the trajectory of the display position of the special timing guide arrow mark 61 is changed, for example, to a parabolic trajectory that runs through the display position of the current special timing guide arrow mark 61 and a predicted position of a display position (e.g., a display position after the elapse of a given time) that is associated with the timing chosen in Step S307. In the case where it is judged in Step S306 that the actual game operation timing is off, by an amount equal to or larger than the given amount, from the timing about which guidance is given by the special timing guide arrow mark 61, the value of the variable NS is reduced by 1 (S309). The processing of Steps S306 through S309 is performed for every special timing guide arrow mark 61 displayed on the game screen (S310), and then the processing is ended.

According to the game device 10 described above, two players are each evaluated for how well they execute game operation and, depending on the evaluation results, the special timing guide arrow mark 61 moves to the opponent player's display area to be used as timing guidance for the opponent player. This enables the players to easily understand which special timing guide arrow mark 61 is relevant to game operation that has caused additional timing to be presented to the opponent player, and which additional timing has been presented as a result, thereby provoking a competing mood between the players.

The present invention is not limited to the above embodiment.

For instance, while the description given above employs the example of carrying out the present invention with the home-use gaming machine 11, the present invention is similarly applicable to any computers including business-use game devices, portable gaming machines, cellular phones, personal computers, and server computers. Also, the DVD-ROM 25, which is used in the above description to supply a game program according to the embodiment of the present invention to a computer, may be replaced by any computer-readable information storage media.

Furthermore, while the game device 10 to which the present invention is applied in the above description gives players a dance-like exercise, the present invention is applicable to all sorts of music game including those played on a drum game device with a controller simulating a drum pad and hit by drum sticks for fun, a Japanese-style drum game device having a Japanese-style drum which is hit by Japanese-style drum sticks, a piano game device with a controller simulating piano keys and hit by a player's fingers, a guitar game device with a controller simulating a guitar and played for fun, a samba dance game device with a controller simulating a maraca and played for fun, and a dance game device with which hand motions of players are detected through controllers and deftness in executing hand motions is the source of competition.

The invention claimed is:

1. A game device for causing each of a first player and a second player to execute a game operation on a controller in time with game music, the game machine comprising a processor which runs a program capable of performing the functions of:
   obtaining timing of said game operation executed by the first player and the second player;
   storing timing data indicating a time when the first player is to execute said game operation and a time when the second player is to execute said game operation;
   displaying timing instruction images to guide the first player and the second player, separately, about when to execute said game operation;
   displaying timing guide images including a normal timing guide and a special timing guide for each of said first player and said second player to guide the first player and the second player, separately, about when to execute said game operation, the timing guide images being created based on the stored timing data, the timing guide images gradually approaching the timing instruction images, wherein said special timing guide has an appearance that is substantially different from said normal timing guide, and the special timing guide of the first player is moving in a first direction within a display section of the first player;
   evaluating said game operation executed by the first player and said game operation executed by the second player by comparing said obtained game operation timing with timing that is represented by the stored timing data that is associated with the special timing guide to generate a deviation amount; and
   gradually transferring, when the deviation is amount less than a given amount, a display position of the special timing guide of the first player, toward a display position of the timing instruction image that guides the second player, thereby changing a trajectory of said special timing guide from the first direction to a second direction different from the first direction, and newly adding timing at which the second player is to execute said game operation, so as to inform the second player of the special timing guide that has caused said newly added timing to be presented,
   wherein when said deviation amount is equal to or larger than said given amount, said trajectory is not changed and new timing is not added at which said second player is to execute said game operation.

2. A game device according to claim 1, wherein:
   the storing further stores candidate timing data which represents one or more candidates of timing added by the gradually moving; and
   the gradually moving gradually moves the display position of the timing instruction image that guides the other player about when to execute said game operation through a display position for one of the timing candidates represented by the candidate stored timing data.

3. The game device of claim 1, wherein the normal timing guide of each of the first player and the second player moves upward toward the respective timing instruction images.

4. The game device of claim 1, wherein the special timing guide of the first player moves in a parabolic trajectory toward the first timing instruction image of the second player.

5. The game device of claim 1, wherein the normal timing guide of each of the first player and the second player moves upward toward the respective timing instruction images, and the special timing guide of the first player moves in a parabolic trajectory toward the timing instruction image of the second player.

6. A game control method for causing each of a first player and a second player to execute a game operation on a controller in time with game music, comprising:
   obtaining timing of the game operation executed by the first player and the second player;
   displaying on a display first timing instruction images to guide the first player and the second player, separately, about when to execute the game operation;
   displaying on said display timing guide images including a normal timing guide and a special timing guide for each of said first player and said second player to guide the first player and the second player, separately, about when to execute the game operation, the timing guide images being created based on stored timing data, the timing data indicating a time when the first player is to execute the game operation and a time when the second player is to execute the game operation, the timing guide images gradually approaching the timing instruction images, wherein said special timing guide has an appearance that is substantially different from said normal timing guide, and the special timing guide of the first player is moving in a first direction within a display section of the first player;

evaluating the game operation that is executed by the first player and the game operation that is executed by the second player by comparing the obtained game operation timing with timing that is represented by the stored timing data that is associated with the special timing guide to generate a deviation amount; and gradually transferring, when the deviation is amount less than a given amount, a display position of the special timing guide of the first player, toward a display position of the timing instruction image that guides the second player, thereby changing a trajectory of said special timing guide from the first direction to a second direction different from the first direction, and newly adding timing at which the second player is to execute the game operation, so as to inform the second player of the special timing guide that has caused said newly added timing to be presented, wherein when said deviation amount is equal to or larger than said given amount, said trajectory is not changed and new timing is not added at which said second player is to execute said game operation.

7. The game control method of claim 6, wherein the normal timing guide of each of the first player and the second player moves upward toward the respective timing instruction images.

8. The game control method of claim 6, wherein the special timing guide of the first player moves in a parabolic trajectory toward the first timing instruction image of the second player.

9. The game control method of claim 6, wherein the normal timing guide of each of the first player and the second player moves upward toward the respective timing instruction images, and the special timing guide of the first player moves in a parabolic trajectory toward the timing instruction image of the second player.

10. A non-transitory computer-readable information storage medium storing a program for causing each of a first player and a second player to execute a game operation on a controller in time with game music and causing a computer to function as:

means for obtaining timing of said game operation executed by the first player and the second player;

means for storing timing data indicating a time when the first player is to execute the game operation and a time when the second player is to execute the game operation;

means for displaying timing instruction images to guide the first player and the second player, separately, about when to execute the game operation;

means for displaying timing guide images including a normal timing guide and a special timing guide for each of said first player and said second player to guide the first player and the second player, separately, about when to execute the game operation, the timing guide images being created based on the stored timing data, the timing guide images gradually approaching the timing instruction images, wherein said special timing guide has an appearance that is substantially different from said normal timing guide, and the special timing guide of the first player is moving in a first direction within a display section of the first player;

means for evaluating the game operation executed by the first player and the game operation executed by the second player by comparing the obtained game operation timing with timing that is represented by the stored timing data that is associated with the special timing guide to generate a deviation amount; and means for gradually transferring, when the deviation is amount less than a given amount, a display position of the special timing guide of the first player toward a display position of the timing instruction image that guides the second player, thereby changing a trajectory of said special timing guide from the first direction to a second direction that is different from the first direction, and newly adding timing at which the second player is to execute the game operation, so as to inform the second player of the special timing guide that has caused said newly added timing to be presented, wherein when said deviation amount is equal to or larger than said given amount, said trajectory is not changed and new timing is not added at which said second player is to execute said game operation.

11. The non-transitory computer readable medium of claim 10, wherein the normal timing guide of each of the first player and the second player moves upward toward the respective timing instruction images.

12. The non-transitory computer readable medium of claim 10, wherein the special timing guide of the first player moves in a parabolic trajectory toward the timing instruction image of the second player.

13. The non-transitory computer readable medium of claim 10, wherein the normal timing guide of each of the first player and the second player moves upward toward the respective timing instruction images, and the special timing guide of the first player moves in a parabolic trajectory toward the timing instruction image of the second player.

* * * * *